US011486517B2

(12) United States Patent
Priser et al.

(10) Patent No.: US 11,486,517 B2
(45) Date of Patent: Nov. 1, 2022

(54) GLAND FOR A SEALED FEEDTHROUGH OF AN ORIFICE OF A PARTITION

(71) Applicant: NAVAL ENERGIES, Paris (FR)

(72) Inventors: Mathieu Priser, Paris (FR); Jean-Yves Perou, Paris (FR)

(73) Assignee: NAVAL ENERGIES, Paris (FR)

( * ) Notice: Subject to any disclaimer, the term of this patent is extended or adjusted under 35 U.S.C. 154(b) by 502 days.

(21) Appl. No.: 16/496,557

(22) PCT Filed: Mar. 23, 2018

(86) PCT No.: PCT/EP2018/057447
§ 371 (c)(1),
(2) Date: Sep. 23, 2019

(87) PCT Pub. No.: WO2018/172524
PCT Pub. Date: Sep. 27, 2018

(65) Prior Publication Data
US 2021/0231236 A1 Jul. 29, 2021

(30) Foreign Application Priority Data

Mar. 24, 2017 (FR) .................................... 17/00310

(51) Int. Cl.
*F16L 5/04* (2006.01)
*F16L 5/08* (2006.01)

(52) U.S. Cl.
CPC .. *F16L 5/04* (2013.01); *F16L 5/08* (2013.01)

(58) Field of Classification Search
CPC ....... F16L 5/04; F16L 5/06; F16L 5/08; F16L 5/10; F16J 15/18; F16J 15/184
See application file for complete search history.

(56) References Cited

U.S. PATENT DOCUMENTS 2,936,187 A 5/1960 Peterson
9,239,114 B2 * 1/2016 Lee ......................... F16J 15/20
(Continued)

FOREIGN PATENT DOCUMENTS

CN 201250904 Y * 6/2009 ............... F16J 15/18
CN 112576755 A * 3/2021 ............. F16J 15/181
(Continued)

OTHER PUBLICATIONS

International Search Report, dated Jun. 12, 2018, from corresponding PCT application No. PCT/EP2018/057447.
(Continued)

*Primary Examiner* — Babajide A Demuren
(74) *Attorney, Agent, or Firm* — Nixon & Vanderhye

(57) ABSTRACT

This gland for a sealed feedthrough of an orifice of a partition using a filiform component such as an electric cable, in particular, of the type including: a gland body for the passage of the filiform component, sealingly fixed to the partition to be passed through opposite the orifice; a seal in the form of a deformable sleeve, placed in a corresponding housing of the gland body, around the component; and a component forming a rammer for compressing the seal in the form of a deformable sleeve and deforming them in the housing of the gland body against the filiform component, so as to provide the seal between the gland body and the filiform component. The seal in the form of a deformable sleeve is in the form of a stack of annular seals.

15 Claims, 2 Drawing Sheets

(56) References Cited

U.S. PATENT DOCUMENTS

| | | | |
|---|---|---|---|
| 2012/0228832 A1* | 9/2012 | Evans | F16J 15/20 |
| | | | 277/500 |
| 2014/0125012 A1* | 5/2014 | Lee | F16J 15/30 |
| | | | 277/500 |
| 2014/0291937 A1 | 10/2014 | Grimanis et al. | |
| 2015/0159756 A1* | 6/2015 | Fan | F16J 15/18 |
| | | | 277/518 |

FOREIGN PATENT DOCUMENTS

| | | |
|---|---|---|
| DE | 2020623 A1 * | 12/1970 |
| DE | 20 2009 004739 U1 | 7/2009 |
| EP | 1 890 368 A2 | 2/2008 |
| FR | 2593578 A2 | 7/1987 |
| JP | 50-29317 U | 4/1975 |
| JP | 52-46315 U | 4/1977 |
| JP | 53-53591 U | 5/1978 |
| JP | 61-180513 A | 8/1986 |
| JP | 7-20040 U | 4/1995 |

OTHER PUBLICATIONS

FR Search Report, dated Dec. 13, 2017, from corresponding FR application No. 1700310.

* cited by examiner

GLAND FOR A SEALED FEEDTHROUGH OF AN ORIFICE OF A PARTITION

BACKGROUND OF THE INVENTION

Field of the Invention

The present invention relates to a gland for sealed feedthrough of an orifice of a partition.

More particularly, the invention relates to a gland of a sealed feedthrough of a partition, using a filiform component in particular such as an electric cable or the like.

Description of the Related Art

One will find an example of realization of such a gland in reference DE 20 2009 004739.

Components other than electric cables can of course be considered, such as optical fibers, hydraulic pipes, gas pipes, etc.

It is known that filiform components, for example cables, can have significant geometric shape flaws, which makes it difficult to obtain good sealing of the feedthrough.

It is also possible to try to ensure the sealing of such a feedthrough, by producing a seal overmolded around the cable.

However, this overmolding technique is delicate to implement (hot thermoplastic overmolding) and difficult to deploy on an outside worksite.

Furthermore, such overmolding results in a non-negligible cost.

Additionally, such overmolding is not removable and does not make it possible to adjust the position of the cable and of these sealing means relative to the feedthrough.

It is known that in the state of the art, glands for sealed feedthrough of such orifices already exist, which comprise a gland body for passage of the component, this body being tightly fastened on the partition or part to be fed through opposite the orifice.

Sealing means in the form of a deformable sleeve are placed in a corresponding housing of the gland body, for example around the filiform component.

A component forming a reamer for compressing the sealing means in the form of a deformable sleeve is also provided, in association with this gland body, to compress and deform these sealing means in the housing of the body of the gland, against the filiform component in order to ensure the sealing between this gland body and the filiform component.

Different embodiments of these sealing means have already been proposed in the state of the art.

However, none of these are fully satisfactory, in particular in terms of taking flaws of the filiform component into account, and in particular of an electric cable.

SUMMARY OF THE INVENTION

The aim of the invention is therefore to resolve these problems.

To that end, the invention relates to a gland for sealed feedthrough of a partition, using a filiform component in particular such as an electric cable, of the type including:
a gland body for the passage of the component, sealingly fixed to the partition to be passed through opposite the orifice;
sealing means in the form of a deformable sleeve, placed in a corresponding housing of the gland body, around the component; and
a component forming a reamer for compressing the sealing means in the form of a deformable sleeve and deforming them in the housing of the gland body against the filiform component, so as to provide the seal between the gland body and the filiform component, characterized in that the sealing means in the form of a deformable sleeve are in the form of a stack of annular seals of general V-shaped section, mounted head to tail one after the other.

According to other features of the gland according to the invention, considered alone or in combination:
the annular seals are made from elastomer;
the gland body is fixed on the partition provided with the orifice by screwing means and it is provided with sealing O-rings between this body and this partition;
the reamer member has a part engaging in the housing of the gland body to compress the sealing means and another part in collar form associated with screwing means on the body to urge the latter in this body;
the screwing means comprise screws regularly distributed around the body;
the component in reamer form is screwed directly in the housing of the gland body to compress the sealing means.

BRIEF DESCRIPTION OF THE DRAWINGS

The invention will be better understood upon reading the following description, provided solely as an example and done in reference to the appended drawings, in which.

DESCRIPTION OF THE PREFERRED EMBODIMENTS

Figure 1:
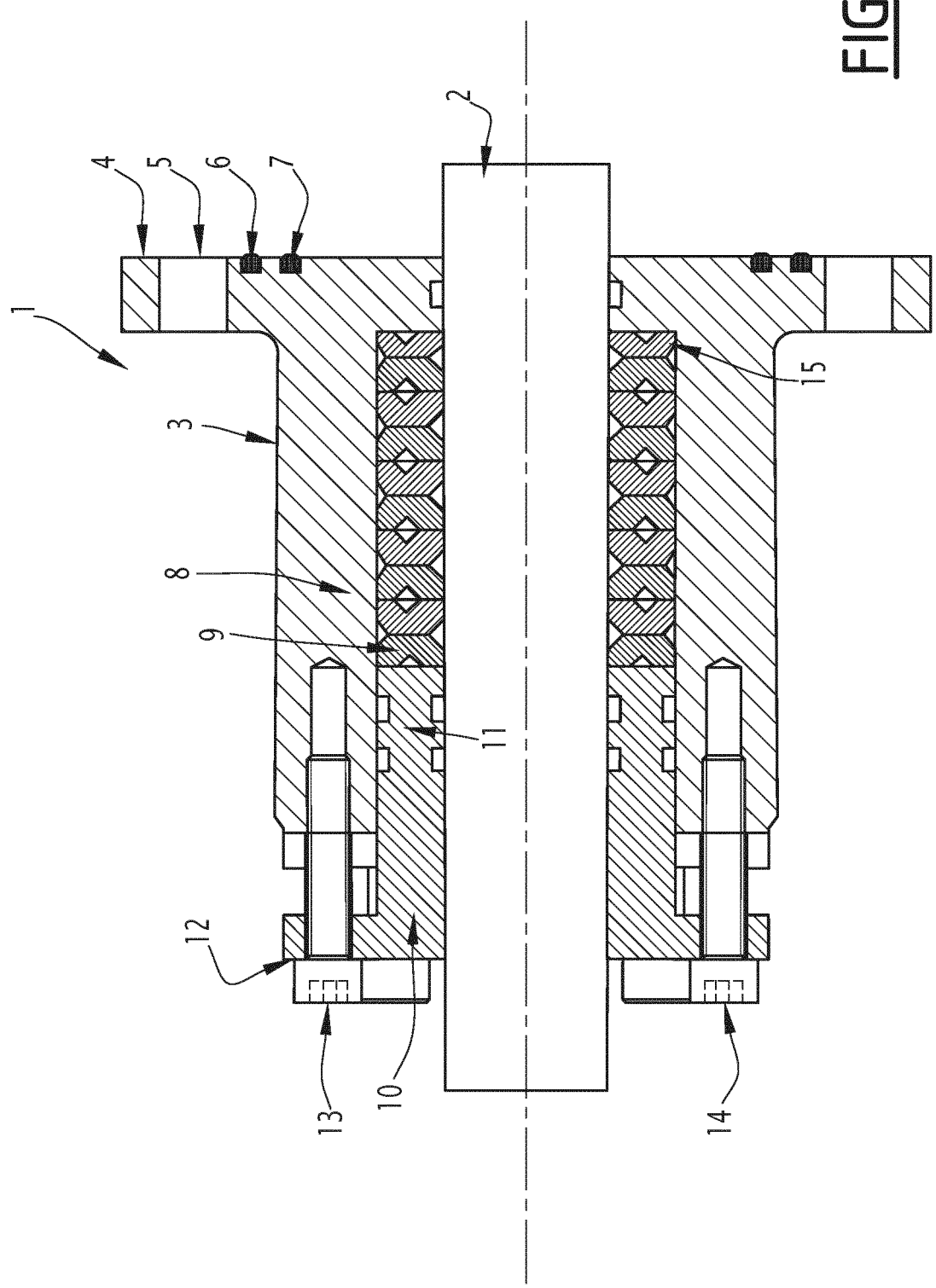
FIG. 1 shows a sectional view of an exemplary embodiment of a feedthrough gland according to the invention.

These figures, and in particular FIG. 1, it indeed illustrate a gland for a sealed feedthrough of an orifice.

In this FIG. 1, the gland is designated by general reference 1, and therefore provides a sealed feedthrough of an orifice of any partition or part, by a filiform component, in particular such as an electric cable, designated by general reference 2 in this FIG. 1.

The latter may have relatively significant appearance flaws.

Conventionally, this gland includes a gland body for passage of the filiform component, designated by general reference 3, and fastened sealably on the partition or part to be passed through, opposite the orifice.

Indeed and as illustrated, this gland body 3 for example includes an outer peripheral collar, designated by general reference 4, provided with holes 5 for the passage of fastening screws of this body on the partition or part.

Furthermore, sealing O-rings, for example 6 and 7, are interposed on the body and the partition and make it possible to ensure the sealing between this gland body and this partition.

This gland body also includes an inner housing 8, in which sealing means are provided in the form of a deformable sleeve, designated by general reference 9 in this FIG. 1, these sealing means therefore being placed in the housing of the body, around the cable 2.

Lastly, the gland also includes a component or member forming a reamer designated by general reference 10 in this FIG. 1, to compress the sealing means in the form of a deformable sleeve and to deform them in the corresponding housing 8 of the gland body, against the elongate member and therefore the cable 2, in order to ensure the sealing of this gland body and the filiform component as well as the cable.

Thus, this reamer-forming member 10 includes a part 11 engaging in the housing 8 of the gland body, to bear on and therefore compress the sealing means 9 and another part 12 in the form of a collar, for example associated with screwing and gripping means of this reamer member on the body in order to urge the latter in the body.

As illustrated, these screwing means for example comprise screws designated by references 13 and 14 in this FIG. 1, these screws being regularly distributed around the body.

Of course, other embodiments can be considered.

Thus, for example, the reamer component can also include a threaded part engaging in a tapped part of the housing of the gland in order to compress the sealing means.

The component is then screwed directly in the body in order to compress the sealing means.

This in particular makes it possible to reduce the diameter of the gland substantially.

According to the invention, the sealing means 9 in the form of a deformable sleeve, placed around the cable, assume the form of a stack of annular seals.

Figure 3:
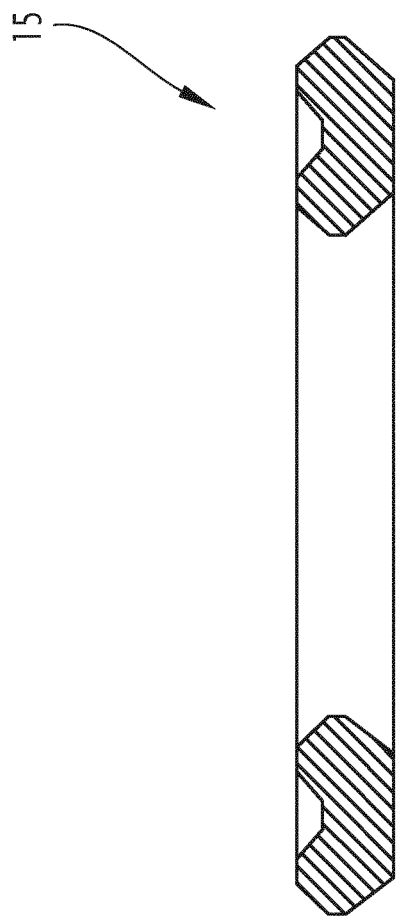
FIGS. 2 and 3 respectively show perspective and sectional views of an annular seal included in the composition of a feedthrough gland according to the invention.
Figure 2:
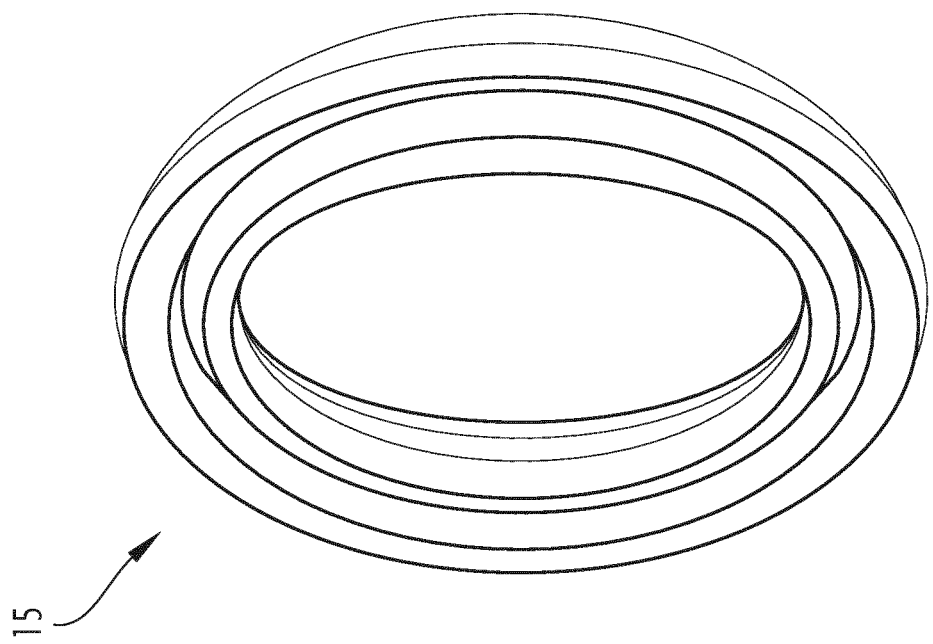

One of these seals is designated by general reference 15 in FIG. 1, and is shown in more detail in FIGS. 2 and 3.

Indeed, these annular seals can for example have a general V- or X-shaped cross-section and can be mounted head to tail one after the other, in order to form a stack of seals in staggered rows.

These seals can be made from an elastomer and can be obtained by machining, which makes it possible to obtain better precision than for a molded seal.

Such a structure makes it possible to obtain very good sealing at the cable, an applied compression rate, between 15 and 25%, and for example at 20%, for example being desirable.

Of course, the hardness of each seal can be selected so as to ensure good deformability of this seal under the compression load.

This makes it possible to obtain a configuration of these seals adapted to the shape flaws of the filiform component and in particular the cable.

Of course, still other embodiments can be considered.

The invention claimed is:

1. A gland for sealed feedthrough of a partition having an orifice, using a filiform component, the gland comprising:
    a gland body configured to receive the filiform component, the gland body being sealingly fixed to the partition to be passed through, opposite the orifice, the gland body including a housing;
    a seal that is a deformable sleeve, the seal that is the deformable sleeve being disposed in the housing of the gland body around the filiform component, the deformable sleeve comprising a stack of V-shaped annular seals mounted head-to-head one after the other, each of the V-shaped annular seals having a head and V-shaped protrusions extending away from the head, the heads of the V-shaped annular seals abutting against the heads of adjacent other ones of the V-shaped annular seals; and
    a reamer component configured to compress the deformable sleeve and to deform the deformable sleeve in the housing of the gland body against the filiform component to seal the gland body and the filiform component.

2. The gland according to claim 1, wherein the V-shaped annular seals are made from elastomer.

3. The gland according to claim 1, wherein the gland body is fixed on the partition provided with the orifice by at least one first screw, and
    the gland further comprises sealing O-rings between the gland body and the partition.

4. The gland according to claim 1, wherein the reamer component has a part engaging in the housing of the gland body to compress the seal and another part that is a collar associated with at least one screw on the gland body to urge the at least one screw in the gland body.

5. The gland according to claim 4, wherein the at least one screw comprises a plurality of screws engaged within the gland body.

6. The gland according to claim 1, wherein the reamer component is screwed directly in the housing of the gland body to compress the seal.

7. The gland according to claim 2, wherein the gland body is fixed on the partition provided with the orifice by at least one first, and
    the gland further comprises sealing O-rings between the gland body and the partition.

8. The gland according to claim 2, wherein the reamer component has a part engaging in the housing of the gland body to compress the seal and another part that is a collar associated with at least one screw on the gland body to urge the at least one screw in the gland body.

9. The gland according to claim 3, wherein the reamer component has a part engaging in the housing of the gland body to compress the seal and another part that is a collar associated with at least one second screw on the gland body to urge the at least one second screw in the gland body.

10. The gland according to claim 7, wherein the reamer component has a part engaging in the housing of the gland body to compress the seal and another part that is a collar associated with at least one second screw on the gland body to urge the at least one second screw in the gland body.

11. The gland according to claim 2, wherein the reamer component is screwed directly in the housing of the gland body to compress the seal.

12. The gland according to claim 3, wherein the reamer component is screwed directly in the housing of the gland body to compress the seal.

13. The gland according to claim 7, wherein the reamer component is screwed directly in the housing of the gland body to compress the seal.

14. The gland according to claim 1, wherein a sealed portion between the gland body and the filiform component is configured to receive an applied compression rate between 15 and 25%.

15. The gland according to claim 1, wherein the filiform component is an electric cable.

* * * * *